P. JONES.
CONDENSING APPARATUS.
APPLICATION FILED NOV. 3, 1915.
1,264,399.
Patented Apr. 30, 1918.
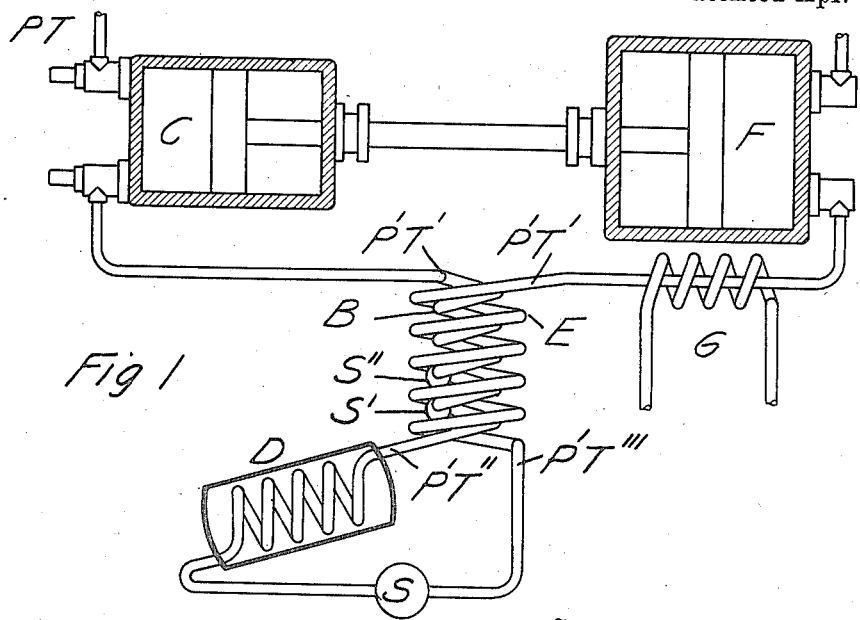
Fig 1
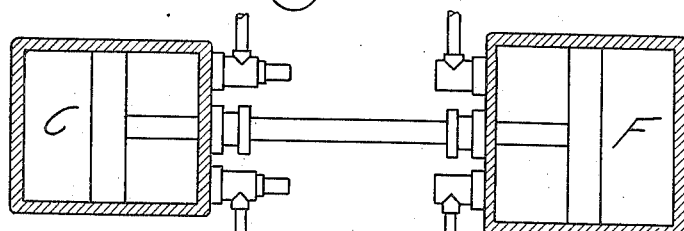
Fig 2
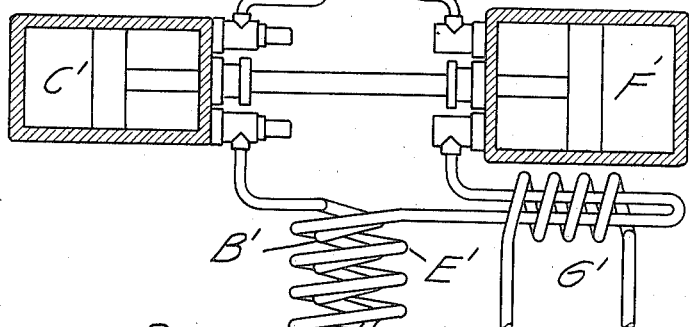
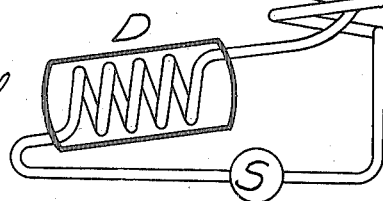
WITNESS
P. E. Cecil
INVENTOR.
Philip Jones.
BY
Geo. J. Henry
ATTORNEY.

UNITED STATES PATENT OFFICE.

PHILIP JONES, OF SANTA MARIA, CALIFORNIA.

CONDENSING APPARATUS.

1,264,399.

Specification of Letters Patent.

Patented Apr. 30, 1918.

Application filed November 3, 1915. Serial No. 59,416.

*To all whom it may concern:*

Be it known that I, PHILIP JONES, a citizen of the United States, residing at Santa Maria, county of Santa Barbara, State of California, have invented a new and useful Condensing Apparatus, of which the following is a specification.

It is the purpose of my invention to recover a larger percentage of condensates by removing during the process of condensation the necessary heat and then to return to the cooled remaining gas the heat abstracted from the compressed mixture, to be then transformed to kinetic energy in an engine or other suitable device.

That is, I abstract the heat from the entire mixture, remove the condensates, and then return to the remaining gas the equivalent heat previously abstracted from it and then employ this heat energy in useful work usually the driving of compressing means.

These advantages I attain by introducing the compressed gaseous mixture through a condenser as for example the entering coil of an interchanger, where its heat is given up to the resultant gas passing in reverse direction through the leaving coil surrounding said entering coil; and providing separation means in the path of the mixture between the entering and leaving stages. Other forms of condensing apparatus may be employed, where the heat of the gaseous mixture has been abstracted before the separation of the condensates and is thereafter returned to the said gaseous mixture. This temporary lowering of the temperature of the mixture is for the purpose of the recovery of the condensates and the return of the heat to the remaining mixture is that it may be recovered as useful work. To facilitate the most efficient recovery of this energy where the character of the mixture or other conditions make it advisable the resulting gas after leaving the cooler may be reheated by supplementary means thus adding energy to the system for additional recovery by the heat engine.

The method heretofore generally employed consists of compressing the gaseous mixture, after which it is cooled by indirect contact with cooling water, brine or other refrigerant or combination thereof, the condensate being removed during or after such cooling the remaining gas is then expanded usually in an engine and the expanded gas used as a further refrigerating agent for the compressed gaseous mixture before reaching the aforesaid engine. Even in this attempted recovery as useful work of a part of the heat energy through the engine (and which is usually used to aid in driving the compressor) but a small amount of such heat energy is actually recovered because of the previous large abstraction of heat from the gas by separate cooling means. The gas coming to the engine largely cooled.

It will be seen that this involves the abstraction of heat from the entire mixture without conservation of this heat for any useful purpose within the process, other disadvantages of the systems heretofore employed are numerous on account of the great range of temperatures employed causing the "freezing" of the engine ports and valves, and difficulties attending lubrication, in addition to the enormous thermodynamic loss occasioned by the deleterious temperature ranges through which the compressor and engine must work.

My invention avoids these defects and enables the condensates to be recovered with a loss of only such heat as corresponds with their actual heat of condensation returning as it does to the outflowing gas, to be later recovered as useful energy, all other heat that may have been removed during intermediate stages of the process thus realizing practically the recovery of the maximum possible energy from the compressed mixture.

In carrying my invention into effect, I provide, preferably, apparatus, including a compressor and prime mover between which is disposed a zone of gaseous flow including two paths of opposite direction and to the gas of one of which is added heat abstracted from the other, for the purposes of heat conservation. Such gaseous paths leading successively to and from the compressor and prime mover, and a condensate separator.

Such apparatus being adapted to perform its functions with but slight fluctuations of temperature other than that required specifically and locally for condensate separation. The working temperature at no point in my system, as usually employed, will fall below approximately that of the atmosphere.

Such system may operate either with or without the supplementary addition of heat and may also work without compressing means.

By referring to the accompanying drawing my apparatus and its operation will be made clear. Similar letters refer to similar parts throughout the figures.

Figure 1— is a diagrammatic view illustrating my process of recovering the condensable constituents of a gaseous mixture by single stage compression and single stage heat engine used to transform the final heat energy to useful work.

Fig. 2— shows the process diagrammatically employing two stage compression and two stage heat engine for driving same.

(C) is a compressor for receiving the gaseous mixture at its initial temperature and pressure, and in which it is compressed as required, the temperature will now be higher and under this condition of increased pressure and temperature it is inducted into the interchanger coil B. It is obvious that cool gas flowing in a parallel or surrounding coil and in an opposite direction will be heated by such inducted mixture, the mixture in turn by giving up such heat is cooled to the required degree at which it throws down, or is about to throw down its condensates.

Fractional condensation may readily be obtained by separation at different points in the cooling process as is well known, by suitable traps arranged at corresponding temperature points. The cooled mixture is then preferably passed into cooler D of any well known form, or a plurality of coolers may be used for various temperature and condensate steps, a suitable trap as S for the condensate or a plurality of traps for the condensates being interposed in the path of the mixture or gas flow. The cooler, I prefer to employ, is of the water tower type although any suitable form may be substituted therefor and traps may be located both before and after the cooler or cooler units as the temperature conditions require.

Thus heavier condensates may be recovered by traps as S′ S″ even before reaching the cooler but during or following the passage through the interchanger coil B.

The gas upon emerging from the separator S is now in its cooled condition, the mass having been reduced by the abstraction of the condensates.

In this cooled condition it is passed through the interchanger coil E preferably in a reversed direction parallel to that flowing in coil B. It will issue from E at a higher temperature due to the heat abstracted from the inflowing mixture within B and the heat abstracted thereby is equal to the heat from the compression of the uncondensable component of the original mixture. That is, the only heat put into the original mixture and not susceptible of recovery in the issuing gas is the heat retained by the condensates until their condensation by its abstraction by the cooler.

In the mixtures rich in condensates this will be a higher percentage than those having a lower proportion of condensates, but it is obvious that with the proper proportioning of the interchanger and the cooler stages that the greatest heat recovery possible may be readily made by the gas flowing from E. This heat is that not theoretically necessary for the condensation process and is now to be recovered as kinetic energy in the heat engine F or other suitable means.

For the purpose of securing all the work, from the engine or other device in which the heat energy is to be converted, and that may be required to drive the compressor C or any other apparatus I prefer where necessary to introduce a reheater G by which the necessary additional heat energy may be added to the gas, that is its temperature further raised, thus enabling us to use from the single engine unit any full amount of energy required including the original energy expended in compressing that portion of the original mixture represented by the gas after the removal of the condensates.

This is the principal advantage of my invention; the recovery of energy in the latter part of the process that has been expended in the early part and which was carried by the mixture during the transition stages to condensation. Also by my invention a single heat engine unit whether of single or multiple stage develops the full kinetic energy of the remaining gas and may if more work is required secure this by the introduction of the reheater described.

It will be obvious that although I have described and shown an interchanger of well known type, that any other suitable device may be used for heat transference from the heated mixture to the outflowing gas, and that although I have shown a separator or trap of the well known drum form for the condensates that any other suitable means may be employed for collecting the condensing constituents.

I have also shown in Fig. 1 the pressure and temperature stages by letters P and T respectively.

Thus the mixture enters the compressor at the temperature T and pressure P its condition being then represented by PT, it enters the coil B at temperature T' pressure P' its condition being represented by P' T'. It enters the cooler at pressure P' temperature T'' its condition being P' T''. It enters the leaving coil of the interchanger at pressure P' temperature T''' its condition being P' T''' and it leaves the interchanger coil E at temperature T' pressure P' its condition is then, and if no reheater be employed remains as, P' T' on entering the heat engine from which it emerges at pressure P—temperature T or the original condition PT. It has however suffered a shrinkage in volume due to the removal of the condensates and therefore the energy recovered is correspondingly less than that expended in compression, this deficit may be made up by reheating at some stage of the process—the deficit may be added at almost any point before use in the heat engine but the preferred point of reheating is as shown at G. The amount of heat added may be greater than necessary to overcome mechanical losses and drive the compressor, and supplementary apparatus may be driven thereby, or the gas may be received in a compressed condition to the interchanger element B and the work of the heat engine may be employed in any other well known way or for any other well known purpose.

If the gas be received under an initial pressure in excess of the final pressure the energy of such initial pressure by my process is recovered and a reheater may be dispensed with or be very small comparatively.

While I have described particularly the process employing a single stage compressor and single stage heat engine for simplicity—a multiple stage process may readily be employed and will in fact most frequently be used especially in large installations.

One such multiple stage process is shown in Fig. 2 where C—C' are the primary and secondary compressor stages; B—B' the primary and secondary interchanger inflow coils; S—S' are separation points, S' not always being employed; E'—E are the secondary and primary interchanger outflow coils; F'—F are the secondary and primary heat engine stages, and G' and G are the reheater elements for such stages, if these be employed.

It will now be obvious that various combinations may be effected of compressor-interchanger-cooler and heat engine units with or without reheater elements by which my method of extraction may be practised and I desire to be understood as claiming such combinations broadly.

I claim:

1. Improved apparatus for the separation of condensates from gaseous mixtures, comprising a source of hot gaseous supply, a means for utilizing gaseous heat, a condensate separator, a conduit from said source of supply to said separator, and a conduit from said separator to said means, said conduits being interrelated for the transfer of heat from said first named conduit to said second named conduit, further means being provided for the addition of heat to the gas before it reaches the means for utilizating gaseous heat.

2. In a process for recovering condensates from gaseous mixtures, first compressing said mixture then cooling same and then separating therefrom, the condensates, and the cooled gas thereafter being employed to cool the entering mixture by which it in turn is heated and then recovering from said heated gas the heat energy thereof and adding heat to said gas in advance of the recovery of heat energy therefrom to increase the amount of energy finally abstracted.

3. An apparatus for the separation of condensates from a gaseous mixture consisting of compressing means in combination with a heat interchanger through which the condensed gaseous mixture is caused to pass, independent cooling means through which the mixture thereafter passes and the cooled emerging gas then passing through the interchanger where it is heated by the inflowing and passing mixture, and means to recover the heat energy of the gas after it issues from the interchanger, and trap means for the separation of condensates.

4. An apparatus for the separation of condensates from a gaseous mixture consisting of compressing means in combination with a heat interchanger through which the condensed gaseous mixture is caused to pass, independent cooling means through which the mixture thereafter passes and the cooled emerging gas then passing through the interchanger where it is heated by the inflowing and passing mixture and means to recover the heat energy of the gas after it issues from the interchanger, and separation trap means for the condensates, and reheating means for the mixture or the gas interposed in the path of flow before its induction to the energy recovering means.

5. A compressor—a heat interchanger—a cooling means, trap means for condensates and a heat engine for the recovery of heat energy and connections between by which a gaseous mixture passes through the compressor thence through one element of the interchanger thence through the cooling means—thence through the second element of the interchanger in a reverse direction and thence through the heat engine, the trap means being located at suitable points between the compressing means and the second element of the interchanger, and reheating means located in advance of the heat engine substantially as described.

6. Apparatus for the compression of gas in combination with a separator to separate the condensates from said gas, a conduit between the separator and the compressor, a conduit from the separator for the remaining cooled gas in juxtaposition to the first named conduit forming a heat interchanger by which the gas flowing to the separator is cooled by giving its heat up to the outflowing residual gas, and means for thereafter recovering the heat energy of the residual gas and utilizing said energy in the apparatus for compression.

PHILIP JONES. [L. S.]

Witnesses:
 JOHN H. YÜNGLING,
 MACK A. KERR.